(12) United States Patent
McMillan

(10) Patent No.: US 8,181,436 B1
(45) Date of Patent: May 22, 2012

(54) ADJUSTABLE MULTI-PURPOSE YARD TOOL

(76) Inventor: Robert L. McMillan, Midland, TX (US)

( * ) Notice: Subject to any disclaimer, the term of this patent is extended or adjusted under 35 U.S.C. 154(b) by 25 days.

(21) Appl. No.: 12/813,267

(22) Filed: Jun. 10, 2010

(51) Int. Cl.
*A01D 7/00* (2006.01)

(52) U.S. Cl. .................. 56/400.04; 56/400.06; 16/426; 16/900

(58) Field of Classification Search ............ 56/400.01, 56/400.04, 400.05, 400.06; 7/114, 116; 294/58; 16/426, 900
See application file for complete search history.

(56) References Cited

U.S. PATENT DOCUMENTS

| | | | | |
|---|---|---|---|---|
| 118,088 A * | 8/1871 | Wilhoit | | 172/375 |
| 943,647 A | 9/1909 | Hunt | | |
| 1,083,054 A * | 12/1913 | Brown | | 294/58 |
| 1,504,913 A * | 8/1924 | Anselmo | | 294/52 |
| 1,534,075 A | 4/1925 | Parrish | | |
| 2,331,414 A * | 10/1943 | Morres | | 172/375 |
| 2,430,802 A * | 11/1947 | Catlin | | 294/58 |
| 2,796,011 A * | 6/1957 | Schmidt | | 172/247 |
| 2,810,409 A * | 10/1957 | Ibelle et al. | | 30/122 |
| 3,155,414 A * | 11/1964 | Bales | | 294/58 |
| 3,466,078 A | 9/1969 | Sholund | | |
| 4,701,142 A | 10/1987 | Merritt | | |
| 4,794,667 A * | 1/1989 | Nelson et al. | | 16/426 |
| 4,916,886 A * | 4/1990 | Nakamura et al. | | 56/12.7 |
| 5,025,621 A * | 6/1991 | DeMarco | | 56/400.05 |
| 5,054,830 A | 10/1991 | Nisenbaum | | |
| 5,060,343 A | 10/1991 | Nisenbaum | | |
| 5,425,226 A * | 6/1995 | Kaufman | | 56/400.06 |
| D365,258 S | 12/1995 | Lambroschino | | |
| 5,609,215 A * | 3/1997 | Rios et al. | | 172/373 |
| 5,799,996 A * | 9/1998 | Fredrickson | | 294/51 |
| 5,850,882 A | 12/1998 | Link | | |
| D484,023 S | 12/2003 | Stout | | |
| 7,014,232 B2 | 3/2006 | Bosa | | |

* cited by examiner

*Primary Examiner* — Thomas Will
*Assistant Examiner* — Mai Nguyen

(57) ABSTRACT

An adjustable multi-purpose yard tool for providing a single tool that has an adjustable handle and performs multiple functions including raking and hoeing includes a pole, a tool head coupled to the pole, and a handle assembly coupled to the pole. The handle assembly is adjustable to a desired position along a length of the pole. The tool head has a connection portion and a tool portion. The tool portion has a hoe portion and a rake portion.

6 Claims, 5 Drawing Sheets

ADJUSTABLE MULTI-PURPOSE YARD TOOL

BACKGROUND OF THE DISCLOSURE

Field of the Disclosure

The disclosure relates to yard tools and more particularly pertains to a new yard tool for providing a single tool that has an adjustable handle and performs multiple functions including raking and hoeing.

SUMMARY OF THE DISCLOSURE

An embodiment of the disclosure meets the needs presented above by generally comprising a pole, a tool head coupled to the pole, and a handle assembly coupled to the pole. The handle assembly is adjustable to a desired position along a length of the pole. The tool head has a connection portion and a tool portion. The tool portion has a hoe portion and a rake portion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
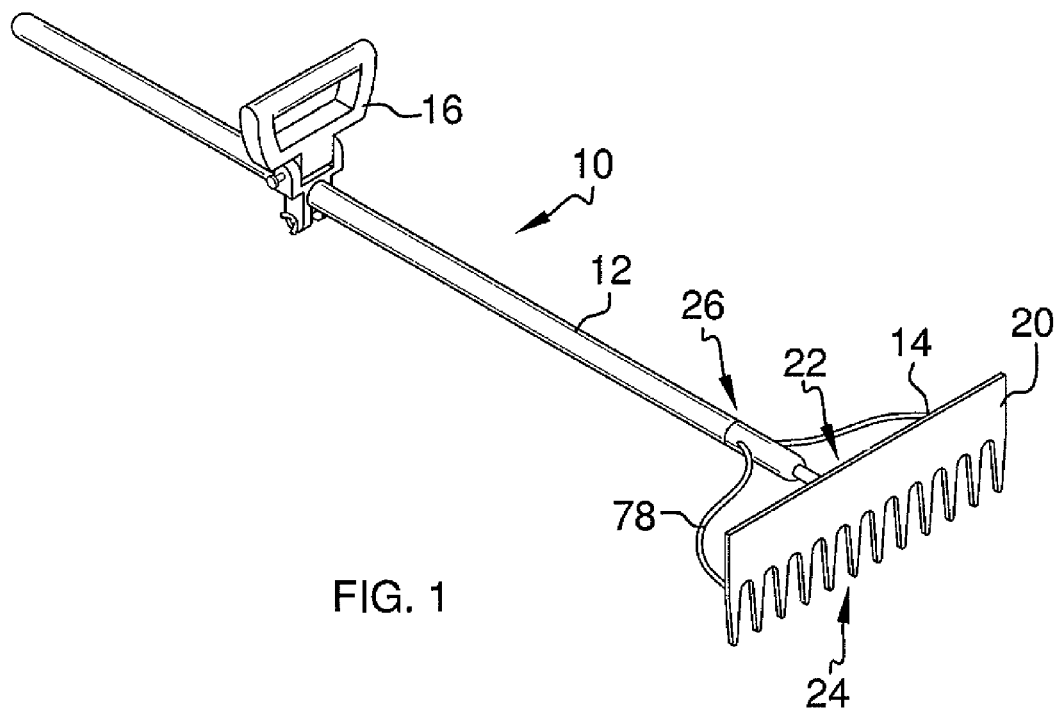
FIG. 1 is a front top side perspective view of a adjustable multi-purpose yard tool according to an embodiment of the disclosure.
Figure 2:
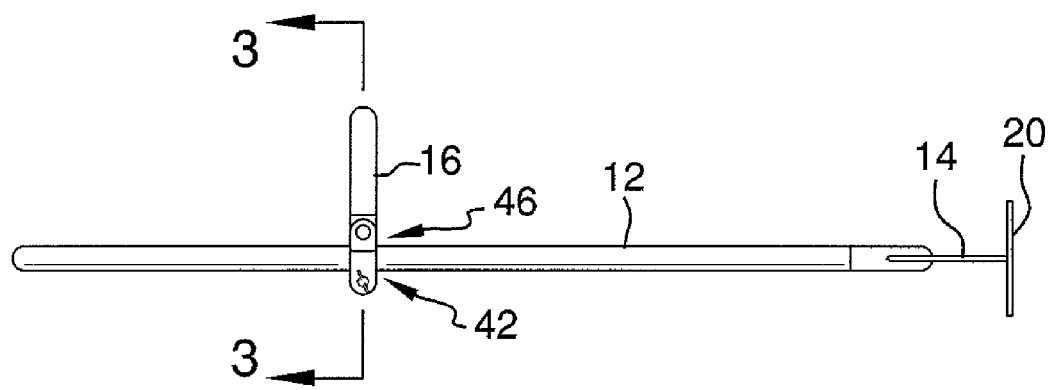
FIG. 2 is a side view of an embodiment of the disclosure.
Figure 3:
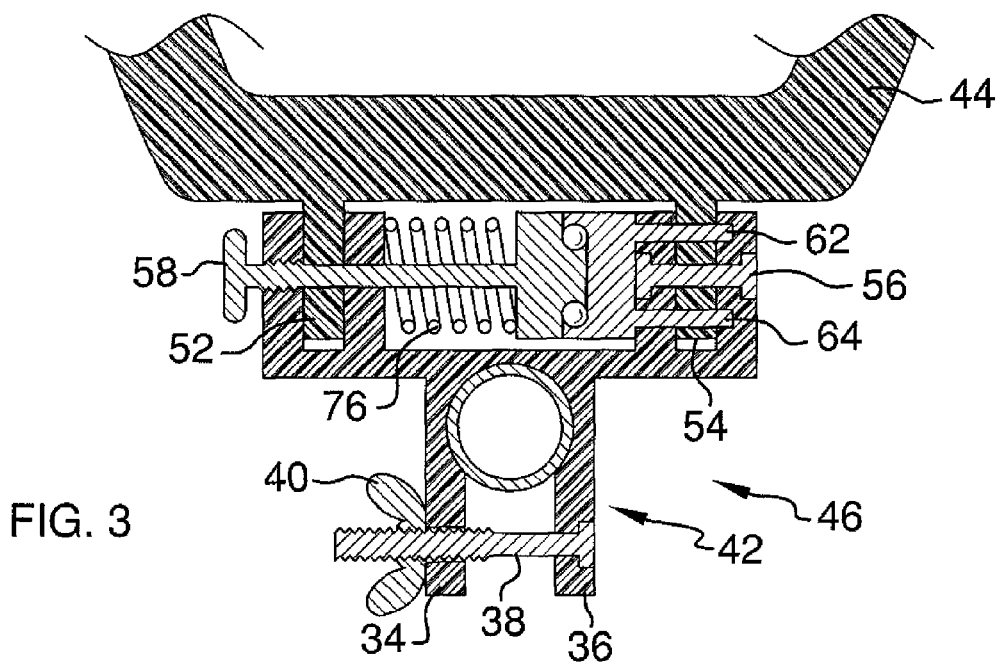
FIG. 3 is a cross-sectional view of an embodiment of the disclosure taken along line 3-3 in FIG. 2.
Figure 4:
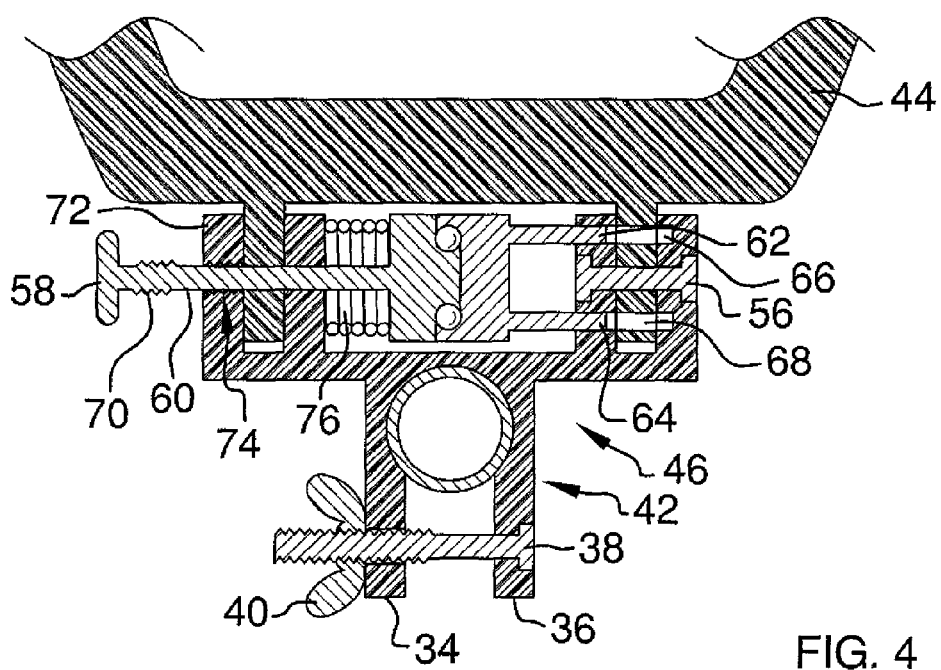
FIG. 4 is a cross-sectional view of an embodiment of the disclosure with a handle locking pin in an unlocked position.
Figure 5:
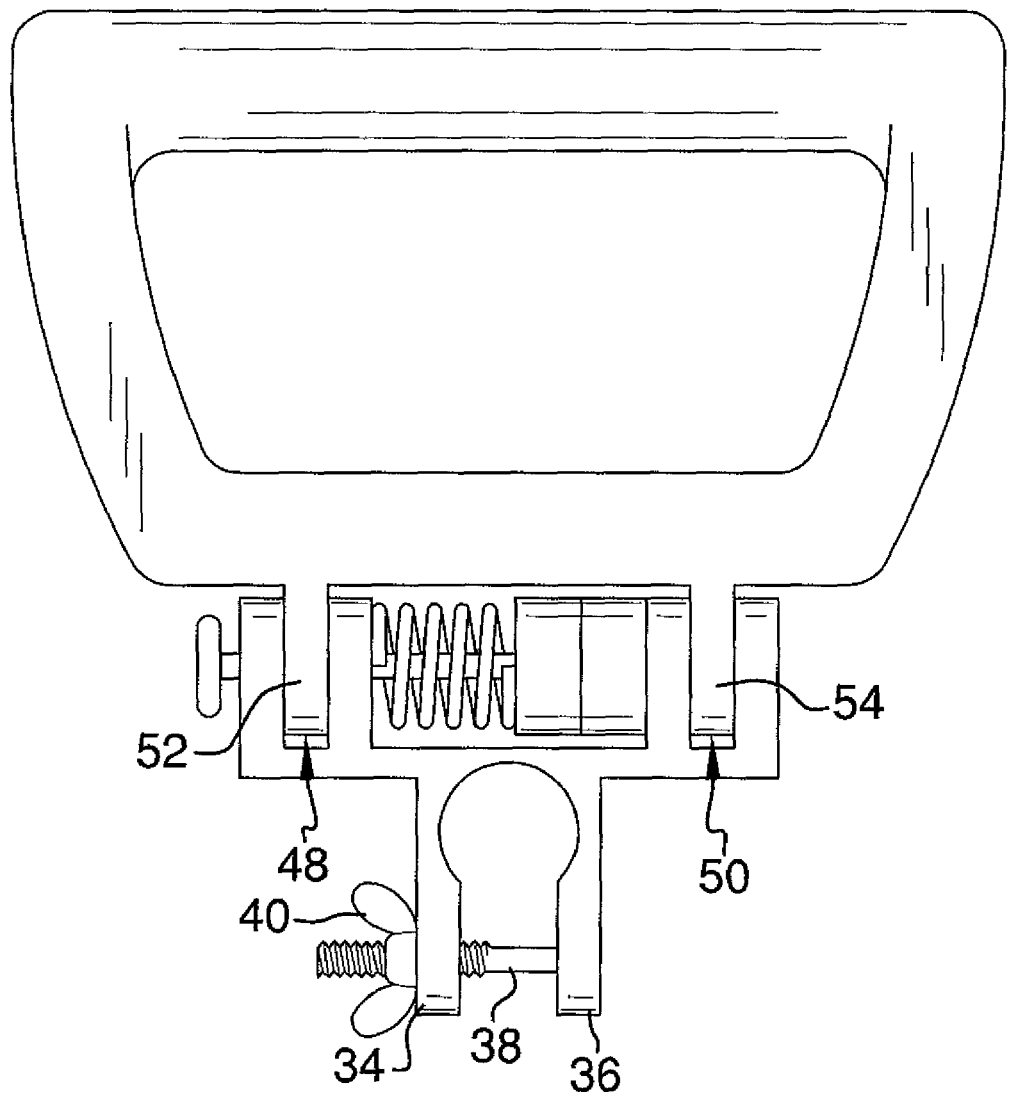
FIG. 5 is a front view of a handle of an embodiment of the disclosure.

With reference now to the drawings, and in particular to FIGS. 1 through 8 thereof, a new yard tool embodying the principles and concepts of an embodiment of the disclosure and generally designated by the reference numeral 10 will be described.

As best illustrated in FIGS. 1 through 8, the adjustable multi-purpose yard tool 10 generally comprises a pole 12, a tool head 14 coupled to the pole 12, and a handle assembly 16 coupled to the pole 12. The handle assembly 16 is adjustable to a desired position along a length of the pole 12. The tool head 14 has a connection portion 18 and a tool portion 20. The tool portion 20 has a hoe portion 22 and a rake portion 24. The rake portion 24 and the hoe portion 22 may be co-planar.

The pole 12 has a connection end 26 and an aperture 28 extending into the connection end 26 of the pole 12. The aperture 28 has interior threading 30. The connection portion 18 of the tool head 14 may be threaded such that the tool head 14 is threadably insertable into the aperture 28. The tool head 14 may also have a pair of stabilizing arms 78,32 extending between the connection portion 18 and the tool portion 20.

The handle assembly 16 has a pair of spaced attachment prongs 34,36. A post member 38 may extend through the pair of spaced attachment prongs 34,36. A tightening member 40 may be couplable to the post member 38 to urge the attachment prongs 34,36 together. Thus, the attachment prongs 34,36 frictionally engage the pole 12 such that the handle assembly 16 is held in a static position relative to the pole 12. The handle assembly 16 has an attachment member 42 coupled to a gripping member 44. An angle adjustment assembly 46 may be provided for coupling the attachment member 42 to the gripping member 44 such that an angle between the attachment member 42 and the gripping member 44 is adjustable. The angle adjustment assembly 46 includes a first slot 48, a second slot 50, a first tab 52 and a second tab 54. The first tab 52 may be positioned in the first slot 48 and the second tab 54 may be positioned in the second slot 50. A pivot pin 56 may couple the second tab 54 in the second slot 50.

A locking pin 58 may have a central post portion 60 extending through the first slot 48 and the first tab 52. The locking pin 58 may have a pair of locking pin posts 62,64 offset from the central post portion 60. The second slot 50 and the second tab 54 have spaced locking apertures 66,68 for receiving the pair of locking pin posts 62,64 such that the gripping member 44 is prevented from pivoting relative to the attachment member 42 when the locking pin posts 62,64 are inserted into the locking apertures 66,68. The central post portion 60 may rotatable relative to the locking pin posts 62,64. The central post portion 60 may have a threaded section 70. A first side 72 of the first slot 48 has a threaded portion 74 for threadably receiving the threaded section 70 of the central post portion 60. The angle adjustment assembly 46 may include a spring member 76 positioned between the first slot 48 and the second slot 50. The spring member 76 biases the locking pin posts 62,66 towards the receiving apertures 66,68.

The hoe portion 22 may have a width equal to a width of the rake portion 20. Alternatively, the hoe portion 22 may have a width less than a width of the rake portion 20. A plurality of tool heads 14 may be provided and interchangeably attached to the pole 12 as desired.

Figure 6:
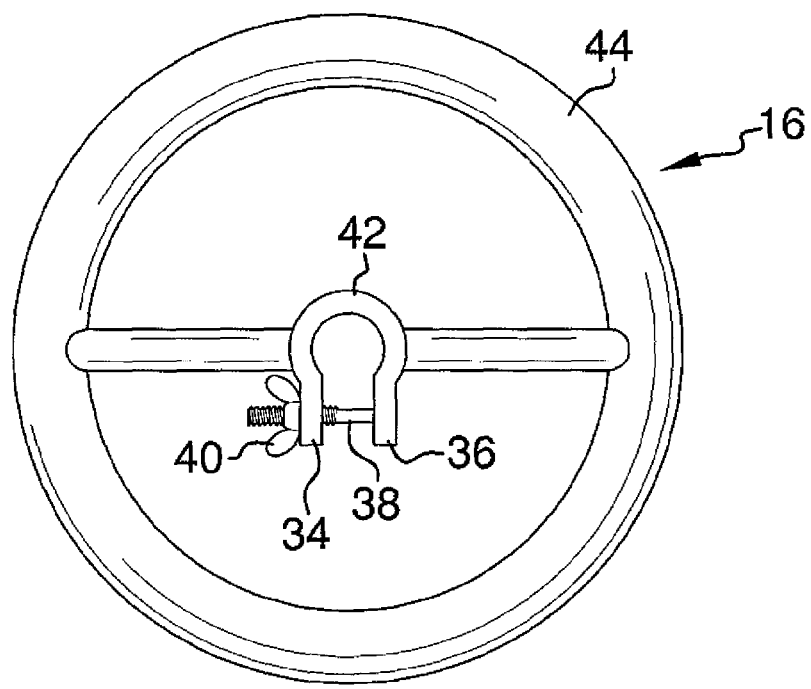
FIG. 6 is a front view of an alternate handle of an embodiment of the disclosure.
Figure 7:
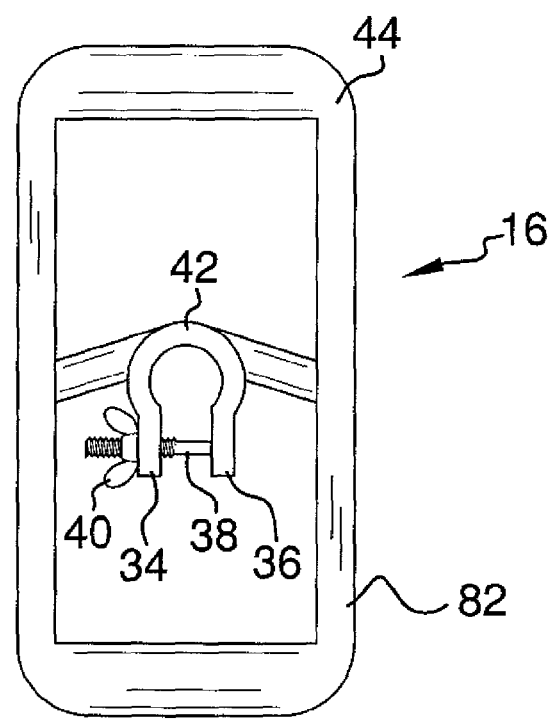
FIG. 7 is a front view of an alternate handle of an embodiment of the disclosure.
Figure 8:
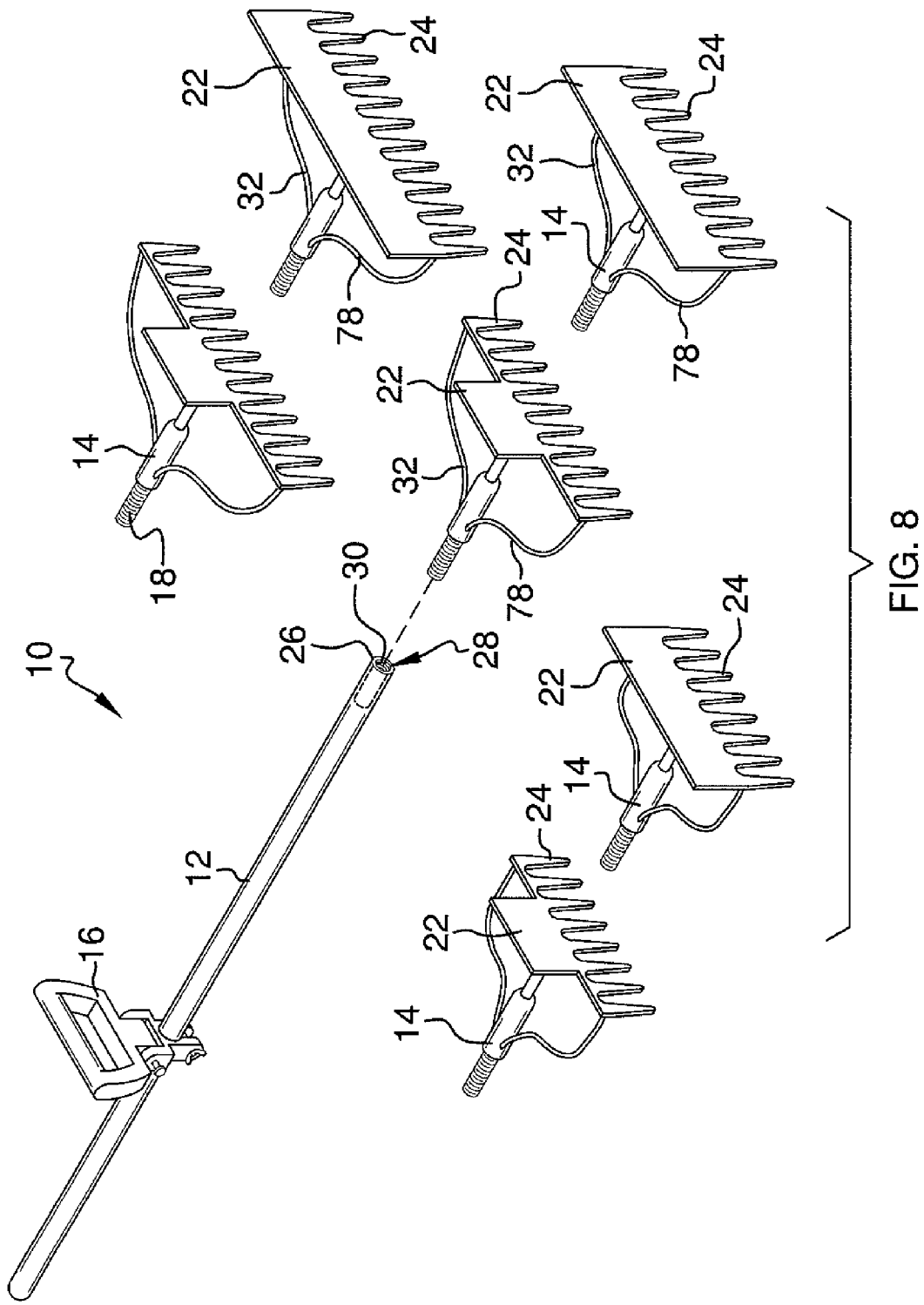
FIG. 8 is a front top side perspective view of interchangeable tool heads of an embodiment of the disclosure.

Alternative handles may be used including the handle assembly 16 having a circular gripping member 78 extending around the pole 12 as shown in FIG. 6 or a rectangular gripping member 82 extending around the pole 12 as shown in FIG. 7.

In use, a desired tool head 14 is attached to the pole 12. The handle assembly 16 is also selected, attached to the pole 12, and adjusted to user preferences for positioning along the length of the pole 12 and for handle angle. The tool 10 may then be used as either a hoe or a rake depending on the orientation of the tool head 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An adjustable multi-purpose yard tool comprising:
   a pole;
   a tool head coupled to said pole;
   a handle assembly coupled to said pole;
   wherein said handle assembly is adjustable to a desired position along a length of said pole;
   said tool head having a connection portion and a tool portion, said tool portion having a hoe portion and a rake portion;
   wherein said rake portion and said hoe portion are co-planar;
   said pole having a connection end and an aperture extending into said connection end of said pole, said aperture having interior threading;
   said connection portion of said tool head being threaded such that said tool head is threadably insertable into said aperture;
   said tool head having a pair of stabilizing arms extending between said connection portion and said tool portion;
   said handle assembly having a pair of spaced attachment prongs;
   a post member extending through said pair of spaced attachment prongs;
   a tightening member couplable to said post member to urge said attachment prongs together whereby said attachment prongs frictionally engage said pole such that said handle assembly is held in a static position relative to said pole;
   said handle assembly having an attachment member coupled to a gripping member;
   an angle adjustment assembly coupling said attachment member to said gripping member such that an angle between said attachment member and said gripping member is adjustable;
   said angle adjustment assembly including a first slot, a second slot, a first tab and a second tab;
   said first tab positioned in said first slot and said second tab positioned in said second slot;
   a pivot pin coupling said second tab in said second slot;
   a locking pin having a central post portion extending through said first slot and said first tab;
   said locking pin having a pair of locking pin posts offset from said central post portion;
   said second slot and said second tab having spaced locking apertures for receiving said pair of locking pin posts such that said gripping member is prevented from pivoting relative to said attachment member when said locking pin posts are inserted into said locking apertures;
   said central post portion being rotatable relative to said locking pin posts;
   said central post portion having a threaded section;
   a first side of said first slot having a threaded portion for threadably receiving said threaded section of said central post portion;
   said angle adjustment assembly including a spring member positioned between said first slot and said second slot; and
   said spring member biasing said locking pin posts towards said receiving apertures.

2. The adjustable multi-purpose yard tool of claim 1, wherein said hoe portion has a width equal to a width of said rake portion.

3. The adjustable multi-purpose yard tool of claim 1, wherein said hoe portion has a width less than a width of said rake portion.

4. An adjustable multi-purpose yard tool comprising:
   a pole;
   a tool head coupled to said pole;
   a handle assembly coupled to said pole;
   wherein said handle assembly is adjustable to a desired position along a length of said pole;
   said tool head having a connection portion and a tool portion, said tool portion having a hoe portion and a rake portion;
   said handle assembly having an attachment member coupled to a gripping member;
   an angle adjustment assembly coupling said attachment member to said gripping member such that an angle between said attachment member and said gripping member is adjustable;
   said angle adjustment assembly including a first slot, a second slot, a first tab and a second tab;
   said first tab positioned in said first slot and said second tab positioned in said second slot;
   a pivot pin coupling said second tab in said second slot;
   a locking pin having a central post portion extending through said first slot and said first tab;
   said locking pin having a pair of locking pin posts offset from said central post portion; and
   said second slot and said second tab having spaced locking apertures for receiving said pair of locking pin posts such that said gripping member is prevented from pivoting relative to said attachment member when said locking pin posts are inserted into said locking apertures.

5. The adjustable multi-purpose yard tool of claim 4, further comprising:
   said central post portion being rotatable relative to said locking pin posts;
   said central post portion having a threaded section; and
   a first side of said first slot having a threaded portion for threadably receiving said threaded section of said central post portion.

6. The adjustable multi-purpose yard tool of claim 4, further comprising:
   said angle adjustment assembly including a spring member positioned between said first slot and said second slot; and
   said spring member biasing said locking pin posts towards said receiving apertures.

* * * * *